(12) United States Patent
Snapp et al.

(10) Patent No.: US 7,769,778 B2
(45) Date of Patent: Aug. 3, 2010

(54) SYSTEMS AND METHODS FOR VALIDATING AN ADDRESS

(75) Inventors: Robert F. Snapp, Memphis, TN (US); James Daniel Self, Millington, TN (US)

(73) Assignee: United States Postal Service, Washington, DC (US)

( * ) Notice: Subject to any disclaimer, the term of this patent is extended or adjusted under 35 U.S.C. 154(b) by 312 days.

(21) Appl. No.: 11/819,905

(22) Filed: Jun. 29, 2007

(65) Prior Publication Data

US 2009/0006394 A1   Jan. 1, 2009

(51) Int. Cl.
*G06F 7/00*   (2006.01)
*G06F 17/30*   (2006.01)

(52) U.S. Cl. .............. 707/780; 707/999.001; 707/999.005; 707/999.006; 707/999.101; 707/999.102; 382/101; 382/229

(58) Field of Classification Search ........... 707/4, 707/6, 101, 102, 999.001, 999.006, 999.101, 707/999.102, 780, 999.005; 382/101, 229
See application file for complete search history.

(56) References Cited

U.S. PATENT DOCUMENTS

| | | | |
|---|---|---|---|
| 5,122,959 A | | 6/1992 | Nathanson et al. |
| 5,524,227 A | * | 6/1996 | Cuthbertson et al. ........ 711/202 |
| 6,041,324 A | * | 3/2000 | Earl et al. ............ 707/999.009 |
| 6,115,707 A | | 9/2000 | Shimomura |

(Continued)

FOREIGN PATENT DOCUMENTS

JP   2003-30237   2/1991

(Continued)

OTHER PUBLICATIONS

Michael Lesk, "Computer Software for Information Management", web archive "http://web.archive.org/web/20060504233907/http://www.lesk.com/mlesk/sciam84/sciam84.html", May 4, 2006,14 pages.*

(Continued)

*Primary Examiner*—John E Breene
*Assistant Examiner*—Phong Nguyen
(74) *Attorney, Agent, or Firm*—Finnegan, Henderson, Farabow, Garrett & Dunner, L.L.P.

(57) ABSTRACT

Systems, methods, and software determine whether a field of an input digital representation of information, such as the street name field in an address, is correct by quickly comparing the field to a list of valid choices for that field. The list of valid choices is generated based on information from the input digital representation, such as a character string. If an exact match is not found, a fuzzy match comparison determines the most closely matching valid choice. If a suitable fuzzy match is not found, then the input information is invalid. Otherwise, another field of the input information, such as the building number field of an address, is tested for validity. If the second field passes the validity check, then the fuzzy match (or exact match) for the field is valid. A fuzzy matching field may replace the input field, thereby correcting the input information.

15 Claims, 6 Drawing Sheets

U.S. PATENT DOCUMENTS

| | | |
|---|---|---|
| 6,564,224 B1 | 5/2003 | Wu et al. |
| 6,575,376 B2 * | 6/2003 | Yu .............................. 235/494 |
| 7,039,640 B2 * | 5/2006 | Miller et al. ................... 707/10 |
| 7,376,636 B1 * | 5/2008 | Wang et al. ..................... 707/1 |
| 7,392,240 B2 * | 6/2008 | Scriffignano et al. ........... 707/3 |
| 2002/0120846 A1 * | 8/2002 | Stewart et al. .............. 713/168 |
| 2002/0124015 A1 * | 9/2002 | Cardno et al. ............... 707/204 |
| 2003/0140064 A1 | 7/2003 | Klean |
| 2004/0064454 A1 * | 4/2004 | Ross et al. ...................... 707/9 |
| 2005/0086256 A1 * | 4/2005 | Owens et al. ........... 707/103 R |
| 2008/0065628 A1 * | 3/2008 | Bansal et al. .................. 707/6 |

FOREIGN PATENT DOCUMENTS

WO     WO 00/79426 A1     12/2000

OTHER PUBLICATIONS

Written Opinion of the International Searching Authority and International Search Report, mailed Jul. 28, 2008, for International Application No. PCT/US07/15123, filed Jun. 29, 2007 (9 pages).

\* cited by examiner

| Delivery Code | Soundex | St. Name | Number Range | ... |
|---|---|---|---|---|
| 67530 | 0700000 | Oak St. | 10 - 99 | |
| 67530 | E820000 | Elm St. | 100 - 500 | |
| ⋮ | ⋮ | ⋮ | ⋮ | |
| 67532 | E820000 | Helm St. | 10000 - 15999 | |
| 67532 | M200000 | Mane St. | 1000 - 4000 | |
| 67532 | M200000 | Maine St. | 10 - 199 | |
| 67532 | M200000 | Mine Av. | 10 - 499 | |
| 67532 | M200000 | Main St. | 400 - 499 | |
| 67532 | M840000 | Mold St. | 5 - 99 | |
| 67532 | P370000 | Park Av. | 100 - 999 | |
| 67534 | A813400 | Albert Av. | 5 - 99 | |
| ⋮ | ⋮ | ⋮ | ⋮ | |
| 67567 | B370000 | Broke Ct. | 2900 - 2999 | |
| ⋮ | ⋮ | ⋮ | ⋮ | |

Fig. 1A

| Locale | St. Name | Number Range | ... |
|---|---|---|---|
| 02 | Helm | 10000 - 15999 | |
| 02 | Mane | 1000 - 4000 | |
| 02 | Maine | 10 - 199 | |
| 02 | Mine | 10 - 499 | |
| 02 | Main | 400 - 499 | |
| 02 | Mold | 5 - 99 | |
| 02 | Park | 100 - 999 | |
| 02 | Albert | 5 - 99 | |
| 02 | Broke | 2900 - 2999 | |
| ⋮ | ⋮ | ⋮ | |

Fig. 1B

| Locale | Street Name |
|---|---|
| 02 | Helm St. |
| 02 | Main St. |
| 02 | Maine St. |
| 02 | Mane St. |
| 02 | Mine Av. |
| 02 | Mold St. |
| 02 | Park Av. |

| Rank | Street Name |
|---|---|
| 1 | Maine |
| 2 | Main |
| 3 | Mane |
| 4 | Mine |
| 5 | Park |
| 6 | Mold |
| 7 | Broke |
| ⋮ | ⋮ |

SYSTEMS AND METHODS FOR VALIDATING AN ADDRESS

FIELD OF THE INVENTION

This invention generally relates to character string validation and error correction and, more specifically, to selecting the best matching word for an incorrectly spelled word, such as a misspelled street name in an address.

BACKGROUND

In a computer or other data processing system, text is typically processed using a standard encoding scheme (e.g., ASCII or Unicode) to represent each of the individual characters (e.g., a letter or a number) in a word or a number. An entire word or number, or group of words or numbers, is typically represented by a set or string of characters in a standard encoding scheme.

In an item delivery environment, character strings are employed to represent information related to items that need to be delivered, such as a piece of mail or a package. In particular, a delivery address indicating the location to which an item is to be delivered may be represented by a character string, or set of character strings. The delivery address may come from various sources: it may be read from the surface of a delivery item by an OCR system; it may come from an electronic mailing list; it may be scanned in from a paper mailing list; etc.

Regardless of the source, a word or number, and the equivalent computer representation, may have an error in it. Errors may be in the form of misspellings, typographical errors, incorrect information, incorrect words, transposed numbers, misread characters, etc. Such errors are often introduced when a word or number is entered into a computer file by a human typist, optical character recognition system, scantron reader, speech recognition system, etc.

Depending upon the end use of the computer representation of the word or number, it may be important to correct such errors. For example, delivery services strive to correct errors in the words and numbers of an address because it is very costly to return a delivery item to a sender, and returned items cause sender dissatisfaction. Yet, to deliver an item, a governmental delivery service, such as the U.S. Postal Service® (USPS®), is legally required to determine with a specified minimum degree of certainty that the digital representation of the address used to direct the delivery of an item is the valid and intended address for delivery. Other delivery services may have similar commercial requirements, because, in general, all delivery services strive to avoid delivering items to the wrong address or returning items to the sender.

Address information may be used for other purposes that require low error rates in address validation and correction processes, in addition to directing items for delivery. For example, the USPS® uses address information to determine whether a customer has filed a change-of-address ("COA") order with the USPS® and to automatically forward a delivery item to a customer's new address when appropriate. Other delivery services may have similar systems and abilities. Other application areas, such as medical services, security services, and financial services, to name a few, also benefit from address information correction and require a high degree of certainty that the words and numbers in a digital representation, such as a character string, are the valid and intended interpretations, and that any corrections are accurate.

One example of a source of addresses that require validation and correction is a mailing list. Organizations typically use mailing lists containing the names and addresses of individuals interested in the organizations' products or services to send material to multiple recipients. Such mailing lists are typically kept in a computer-readable form, such as a text file or a database file. An organization may provide a mailing list to a delivery service, such as the U.S. Postal Service, for use in sending, for example, newsletters, periodicals, or advertising to the individuals on the mailing list. Organizations wish to avoid wasting materials and money by sending material to invalid or incorrect addresses contained in their mailing list.

It is worth noting that accurate mailing lists are valuable in their own right. For some organizations, such as specialized niche publications or charitable groups, their mailing lists may be revenue-generating assets. There are even mailing list brokers that help organizations maximize the value of their mailing lists by renting or selling them. The value of a mailing list is enhanced when the addresses on it are valid and error-free.

Accordingly, it is desirable to develop systems and methods that recognize errors in digital representations of address information, and accurately correct such errors. For many applications, it is also desirable to validate and correct address information in a speedy manner.

SUMMARY OF THE INVENTION

Embodiments consistent with the present invention include systems, methods, and software for validating an address comprising operations and/or apparatus for identifying a set of street name character strings corresponding to the streets in a defined geographic focal locale; organizing the set of street name character strings into a fast search table; receiving an input address string containing an input street name character string field and an input building number string field, wherein the input address string represents a location within the defined geographic focal locale; searching the fast search table for a matching street name character string that exactly matches the input street name character string field; if an exactly matching string is not found, determining the matching street name character string from the fast search table to be a street name character string that most closely matches the input street name character string field; accessing, according to the matching street name character string, a single address record from a plurality of address records in a comprehensive address data set, wherein the single address record includes a number range; calculating whether the input building number string field represents a number that is within the number range; and if the input building number string field represents a number that is within the number range, outputting an indication that the input address string is valid.

Further embodiments consistent with the present invention include systems, methods, and software for validating an address using operations and apparatus for receiving an input address having an input street name field and an input building number field, wherein the input address represents a location within a defined geographic area; searching a fast search table corresponding to the defined geographic area for a matching street name that exactly matches the input street name field, wherein the fast search table comprises representations of streets in the defined geographic area; if an exactly matching street name is not found, assigning the matching street name to be a street name from the fast search table that exceeds a predetermined threshold of similarity to the input street name field; accessing a number range from an address data record corresponding to the matching street name, wherein the address data record is one among a plurality of address data records; calculating whether the input building number field represents a number that is encompassed by the number range; and if the input building number field represents a number that is encompassed by the number range, outputting an indication that the input address is valid.

Advantages and aspects of the invention will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1A is a representation of an exemplary address information data set including phonetic code representations;

FIG. 1B is a representation of an exemplary address information data set consistent with an embodiment of the invention;

DESCRIPTION OF EXEMPLARY EMBODIMENTS

Figure 2A:
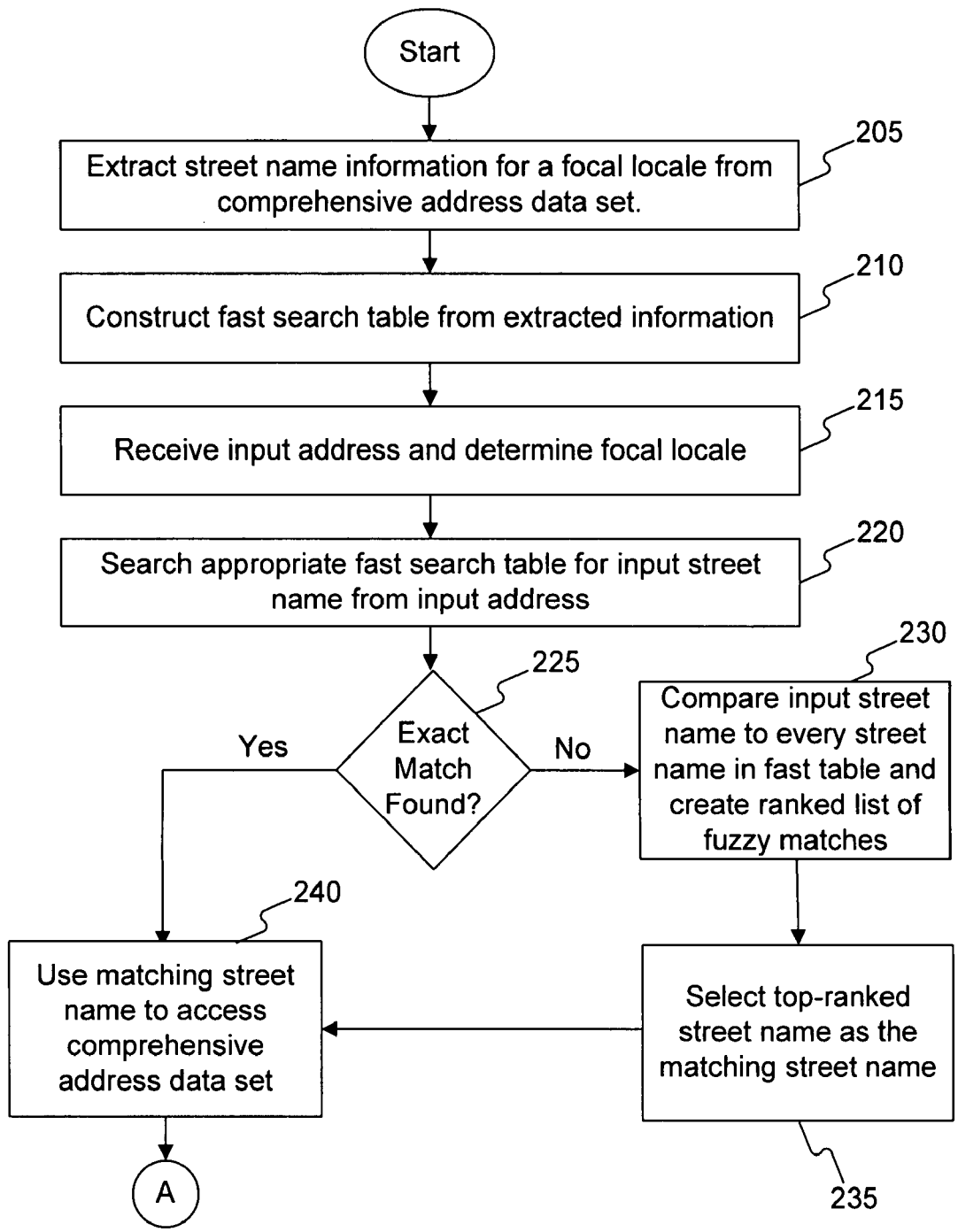
FIGS. 2A and 2B are a flow chart of an exemplary process for recognizing and correcting errors in a digital representation of an address consistent with an embodiment of the invention.

Reference will now be made in detail to exemplary embodiments of the invention, examples of which are illustrated in the accompanying drawings. Wherever convenient, the same reference numbers will be used throughout the drawings to refer to the same or like parts.

The USPS® has developed systems and techniques to recognize and correct errors in the computer or digital representations of words and numbers, including the words or numbers in an address used by the USPS® for directing the delivery of items. Other delivery services may have similar systems. One USPS® system in this area is called the address matching engine or ZIP+4® engine, which is a computer application that uses an address data set listing all cities and streets organized by delivery area and including the ranges of street numbers for the buildings that the USPS® delivers to along those streets. Certain embodiments of the ZIP+4® engine are described in U.S. Pat. No. 7,031,959, which is hereby incorporated herein by reference.

In operation, the ZIP+4® engine accepts an input address, such as "123 Main, Greatbend, KS," and first produces a corresponding digital representation, such as a character string, in a standardized format, such as "123 MAIN ST, GREAT BEND, KS 67532-1439." After converting the input address to a standardized form, the ZIP+4® engine evaluates the standardized street name field (e.g., "MAIN ST") and the building number field (e.g., "123") to verify that there is an actual street name in the delivery area specified by the address (e.g., an area that encompasses ZIP Code™ "67532") that matches the input street name, and if so, that the street number is within the range of valid building numbers for that matching street. The ZIP+4® engine typically evaluates an area larger than the ZIP Code™ area identified in the input address, including, as explained below, a USPS® finance number area. As mentioned, to perform this evaluation, the ZIP+4® engine uses a predetermined, address information data set maintained by the USPS® for each delivery area.

FIG. 1A is a representation of an exemplary address information data set used by the ZIP+4® engine. As shown, this data set groups all streets in a ZIP Code™ delivery code area (column 105) and relates to each standardized street name (column 115) a range of building numbers (column 120) that the USPS® delivers to along that street. For example, the set of rows labeled 130 indicates the streets (Oak, Elm, ... ) that are in a geographic area including ZIP Code™ 67530. In this example, the number range "100-500" (labeled 140 in FIG. 1A) is the range of numbers that includes all the building numbers on Elm St. in ZIP Code™ 67530.

As shown, the data set also includes the Soundex code representation (column 110) (explained below) of each standardized street name (column 115), and may contain other information (represented by 125) that is not important to this explanation. There may be additional rows or records 127 included in the data set. In one embodiment, the data set may be stored on a computer-readable medium for access by a computer application, such as the ZIP+4® engine.

Referring to FIG. 1A, for an input address such as "123 MAIN ST, GREAT BEND, KS 67532-1439," the ZIP+4® engine searches for street names that are a phonetic match for the street name portion ("MAIN") of the address, and then evaluates the associated number range of each phonetically matching street name to determine whether the range encompasses the building number portion ("123") from the input address. A phonetically matching street name is a street name that is spelled differently from the input street name, but that sounds similar when pronounced. In phonetic matching, the basic aim is for words with the same pronunciation to be encoded to the same output representation so that matching can occur despite minor differences in spelling. Of the various phonetic algorithms, Soundex is perhaps the most widely known. In FIG. 1A, the Soundex codes representing corresponding street names are shown in column 110. To find the street names that are a phonetic match for the input street name, the ZIP+4® engine searches column 110 for Soundex codes that are the same as the Soundex code for the input street name. In the case of an input street name of "MAIN," which the ZIP+4® engine would convert into a Soundex code representation of "M200000," the data table includes four streets (label 135), "Mane," "Maine," "Mine," and "Main," that have a Soundex code representation of "M200000." In this example, the ZIP+4® engine would perform further processing on the data for each of those four Soundex-matching streets 135.

The Soundex phonetic algorithm was developed by Robert Russell and Margaret Odell and is described in U.S. Pat. No. 1,261,167 and U.S. Pat. No. 1,435,663, which are hereby incorporated herein by reference. As illustrated by rows 135 in the data table of FIG. 1A, a phonetic algorithm comparing two character strings representing words will produce an identical phonetic code for each word if the words are sufficiently similar to each other in spelling and pronunciation. The Soundex-based phonetic algorithm used in the USPS® ZIP+4® engine produces a phonetic code consisting of an textual representation of the first character of a street name, followed by 3 bytes of binary data in which each half-byte contains a token for consonant sounds that follow the first letter in the street name.

More specifically, the phonetic algorithm used in the ZIP+4® engine executes the following steps: (1) preserve the first character of the street name (e.g., the "M" from "Main"); (2) condense the street name by eliminating embedded spaces and repeated consonants (e.g., "East Main" becomes "East-Main"); and (3) assign each remaining consonant in the condensed word a numeric code according to the phonetic rules of the algorithm, until the end of the word is reached or until six codes have been assigned. The ZIP+4® engine uses the following Soundex-based phonetic rules in its algorithm:

a. Assign a 0 to each "S" and "Z";
b. Assign a 1 to each "B" and "P";
c. Assign a 2 to each "M" and "N";
d. Assign a 3 to each "R";
e. Assign a 4 to each "D" and "T";
f. Assign a 5 to each "F" and "V";
g. Assign a 6 to each "J";
h. If a "C" is followed by an "E", "I", or "Y", assign it a 0 (like "S" above); otherwise, assign it a 7;
i. If a "G" is followed by an "E", "I", or "Y", assign it a 6 (like "J" above); otherwise, assign it an 7 (like hard "C" above);
j. Assign a 7 (like hard "C" and hard "G" above) to each "K" and "Q"; and
k. Assign an 8 to each "L".

This set of rules yields representations for examples of street names as shown in column 110 of the data set shown in FIG. 1A. As noted above and shown in the rows labeled 135, the Soundex phonetic algorithm produces the same code "M200000" to represent the character strings for the street names "Mane," "Maine," "Mine," and "Main," and it is frequently the case that the address data set will have several street names that are phonetic matches for an input street name. Consequently, the ZIP+4® engine often spends a large amount of time performing multiple accesses to the address data set to get information needed for building number range processing and performing the number range processing algorithms multiple times.

The type of phonetic algorithm used in the ZIP+4® engine™ is said to be "left-weighted," which means the matching logic assumes that the first characters of the input word are spelled correctly. For example, this type of algorithm produces the same phonetic code for the words "MAIN" and "MAINE," but very different phonetic codes for "MAIN" (M200000) and "EMAIN" (E220000) Thus, if the error in an input word involves the first character, a left-weighted algorithm will produce a phonetic code that will differ greatly from the correctly spelled word and would not consider the words to be a fuzzy match.

Another shortcoming of phonetic algorithms is their inability to match words having single-letter errors that produce phonetic codes that differ from the correctly spelled version of the word—in other words, minor spelling errors that change the English pronunciation of a word. Table 1 shows examples of how a single incorrect vowel can alter the pronunciation of a word, which will dramatically change the phonetic code for the word produced by a phonetic algorithm:

TABLE 1

| Street Name String | Pronunciation | Soundex Code |
|---|---|---|
| CEDAR RIDGU | hard "G" as in "golf" before "U" | C434700 |
| CEDAR RIDGE | soft "G" as in "gentle" before silent "E" | C434600 |
| TERRACU | hard "C" as in "care" before "U" | T370000 |
| TERRACE | sibilant C as in "certify" before silent "E" | T300000 |

As shown in Table 1, a Soundex phonetic algorithm would not consider the misspelled street name "Cedar Ridgu" to be a close match for the correctly spelled "Cedar Ridge" and would not consider the misspelled street name "Terracu" to be a close match for the correctly spelled "Terrace."

Yet another shortcoming of phonetic matching algorithms is that they cannot be applied to numbers, such as a ZIP Code™ delivery code.

As noted above, for each street name in the data table that phonetically matches the input street name, the ZIP+4® engine™ performs address range check processing using number range data 120 from the data set. For the input address "123 MAIN ST, GREAT BEND, KS 67532-1439" example, the ZIP+4® engine would access the data set and evaluate whether the building number "123" is within the street number range 147 for Main Street, (and determine that it is not, because the range 147 is from "400-499"), and then perform similar accesses and evaluations for "Mine," "Maine," and "Mane." Multiple iterations of the address range check processing are time consuming and inefficient. Embodiments consistent with the principals of the invention solve Many of the shortcomings of the ZIP+4® engine.

Figure 2B:
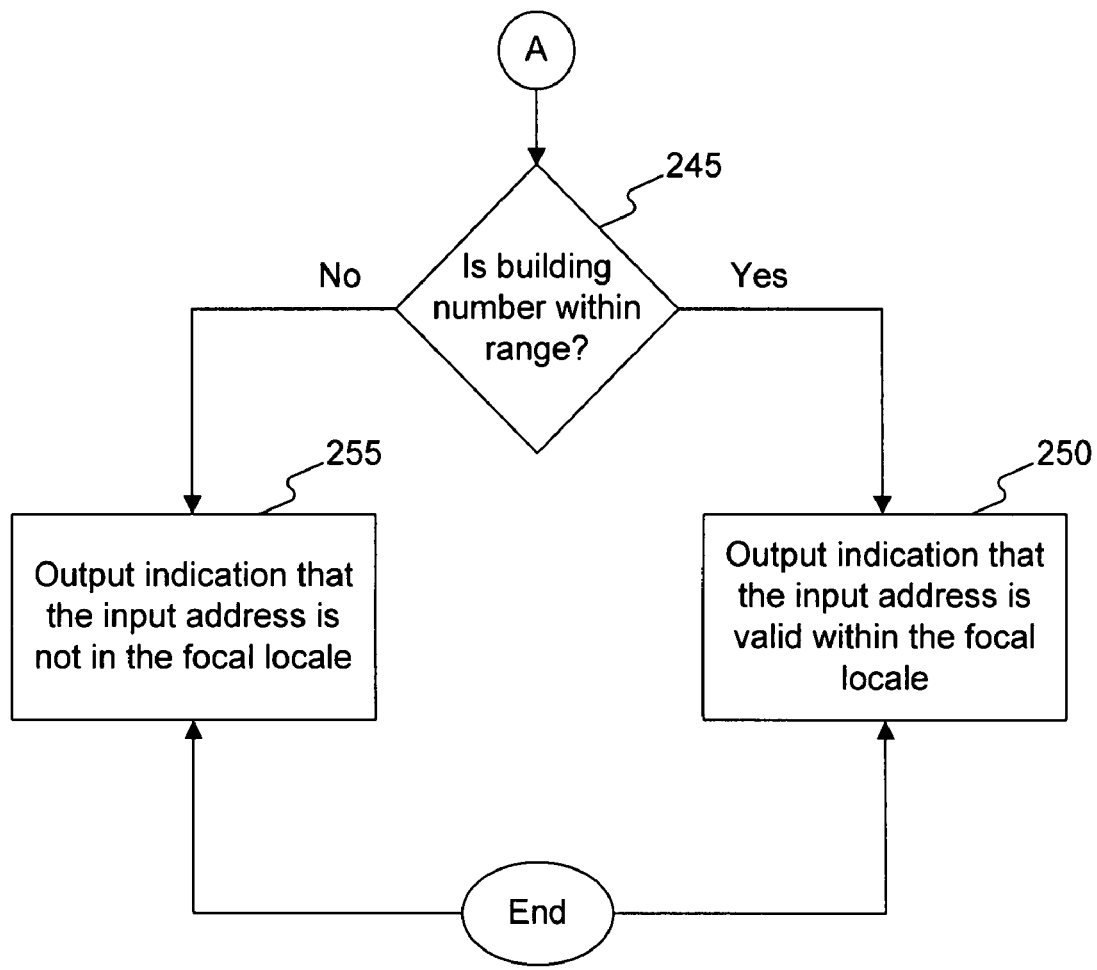

FIGS. 2A and 2B are a flow chart of an exemplary process for recognizing and correcting errors in a digital representation of an address consistent with an embodiment of the invention. As shown, the process begins by extracting street name information for a given focal locale from a comprehensive address data set (stage 205). In one embodiment, the comprehensive address data set may be a legacy data set such as the data set used by the ZIP+4® engine, which is represented in FIG. 1A. In another embodiment, the comprehensive address data set contains additional information, such as geographic locale information, in addition to other address information such as street name, delivery point building numbers and/or building number range, and ZIP Code™ delivery codes. FIG. 1B is a representation of an exemplary comprehensive address information data set 150 consistent with such an embodiment of the invention. As shown in FIG. 1B, the address information data set 150 may contain street name information 165, building number range information 170, and other information 175 related to addresses, all conceptually organized in rows or records for each street name 165. In the embodiment shown, the address information for the entire data set is grouped by focal locale 155 such that all the streets in the geographic area represented by the focal locale identifier "02" are in the same data table. In other embodiments, address information for several focal locales may be contained in the same data set and indexed by the focal locale attribute 155. In yet other embodiments, a focal locale attribute 155 may be added to the address information in each row of a legacy data set, such as the data set shown in FIG. 1A, allowing all the address information for streets in the same focal locale to be accessed, searched, and grouped together.

The focal locale may be any defined geographic area. In one embodiment, the focal locale is larger than a single ZIP Code™ area, because although it may not be wise to make the focal locale too large, (which may result in many duplicate street names or similar spelled street names within nearby towns and cities), it increases efficiency to make the scope of the focal locale large enough to capture cases where the address the sender intended can be matched to an address in the surrounding geographic area, even if is not in the exact town or city specified in the input address. The focal locale may be determined by any criteria. For example, for fiscal accounting purposes, the USPS® assigns a "finance number" to groups of delivery areas across the country, where each delivery area in the group corresponding to a given finance number may include several cities, several ZIP Codes™ areas, and possibly span across more than one state. In one embodiment, the finance number associated with the city, state, and/or ZIP Code™ delivery code of an address is considered the focal locale for that address. In other embodiments, the focal locale may be an area encompassed by a group of contiguous ZIP Code™ areas, city, county, state, or other political subdivision.

One of ordinary skill will recognize that an address information data set may contain more or less information than shown in FIG. 1B consistent with the principles of the invention, as represented by 175. For example, an address information data set may contain street name aliases, along with the standardized street names, which may be useful in determining where a sender intended an item to be delivered. A street name alias may include, for example, the former name of a street whose name was changed. For another example, an address data set 150 may not include the street name column 165 in implementations where the street names extracted into a search table (explained in the next stage) include links to their corresponding row of data in the address data set 150.

Figures 3A, 3B, 3C:
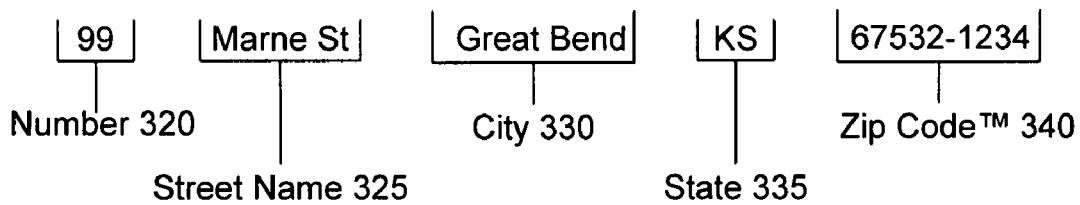
FIG. 3A is a representation of an exemplary search table of character strings consistent with an embodiment of the invention.
FIG. 3B is a diagram of an exemplary location description character string divided into fields of character strings consistent with an implementation of the invention.
FIG. 3C is a representation of an exemplary ranked list of error-corrected character strings consistent with an embodiment of the invention.

Referring again to FIG. 2A, the process next constructs a search table out of the street names for all the streets in the focal locale (stage 210). In the embodiment shown, the search table is termed a fast search table to represent that it is preferably organized for employment of a rapid searching algorithm. In one embodiment, the fast search table is a data structure that includes the street name strings in an alphabetically ordered list so that a binary search algorithm can be employed on the list. For example, FIG. 3A is a representation of an exemplary search table of character strings 300 consistent with one embodiment of the invention. As shown in the example of FIG. 3A, the street names 310 are arranged in alphabetical order to facilitate a rapid binary search of table 300, and all the streets in table 300 are from the same focal locale 305, which is represented by an arbitrary locale number "02" in this example to correspond with the example of a comprehensive address data set 150 shown in FIG. 1B. In other embodiments, the fast search table 300 may be any organization of the street names that facilitates a rapid search of the street name to determine whether or not a specified input street name is among the street names in the table. In some embodiments, the street names may not require any particular organization because the search algorithm does not benefit from any particular organization of the character strings. In other embodiments another data structure, such as a hash table, may be used to aid an algorithm searching for an input street name in a search table. In one embodiment consistent with the invention, the fast search table 300 contains street name aliases in addition to standardized street names for a focal locale.

As noted above, the focal locale 305 may correspond to a finance number geographic area, or other geographic area. In one embodiment, fast search tables are constructed for all focal locales of interest, for instance, all the USPS® finance number geographic areas in the United States.

With a fast search table(s) ready for use, the process receives an input address and determines the focal locale corresponding to the address (stage 215), as shown in FIG. 2A. The input address is an address that needs to be validated and corrected, if necessary. The input address may come from any source, such as mailing list, an OCR system that reads the address from an item, a mailing database, a customer database, an employee record, a government record, or some other source. As shown in FIG. 3B, which is a diagram of an exemplary input address character string divided into fields of character strings, a U.S. address may be considered as having five fields: a number field 320, a street name field 325, a city name field 330, a state name field 335, and a ZIP Code™ field 340. In the implementation shown, each of these fields contains information in a character string. One of ordinary skill will recognize that addresses from other countries having different formats, fields, or components than the one shown may be similarly processed after simple adaptation of the disclosed embodiments. One of ordinary skill will also recognize that an input address may be digitally represented in a computer in other formats in addition to character strings, and that such representations may be similarly processed after simple adaptation of the disclosed embodiments.

At stage 215, the process may determine the focal locale corresponding to the input address based on the city name field 330, the state name field 335, and/or the ZIP Code™ field 340, or any combination of these fields. For example, the USPS® maintains a database of ZIP Code™ delivery codes belonging to each finance number. In a USPS® example, the process my determine the finance number focal locale by looking up the finance number corresponding to the ZIP Code™ delivery code in the ZIP Code™ field 340 of the input address. Using the input address shown in FIG. 3B, assume for purposes of explanation that the process shown in FIG. 2A determines that the input address "99 Marne St, Great Bend, KS 67532" corresponds to a focal locale designated by the number "02," (as shown in FIG. 3A).

Next, the process performs a search of the appropriate fast search table for the focal locale to determine whether the fast search table contains a street name matching the street name field 325 of the input address (stage 220). Continuing with the example, the process may perform a binary search of table 300 (FIG. 3A) for the street name "Marne." Other implementations may use a search algorithm other than a binary search algorithm, such as an interpolation search algorithm, Grover's search algorithm, or a hash table search algorithm, among others.

At stage 225, the process determines whether there is an exact match for the input street name in the fast search table. If so (stage 225, yes), then the process branches to stage 240. Otherwise (stage 225, no), the process branches to stage 230. A rapid search in stage 220 may be advantageous in embodiments that process a large number of input addresses, such as might come from a mailing list, because time saved quickly finding exact matches (stage 225, yes) may offset time spent searching for non-exact matches (stage 225, no).

At stage 240, for the case where there is an exact match for the input street name in the fast search table, the process uses the matching input street name to access information about the street in the comprehensive address data set, such as the data set 150 shown in FIG. 1B. Because the fast search table is generated from the street names in the comprehensive address data set, there is a direct one-to-one correspondence between the street names in the fast search table and a data record or row in the comprehensive address data set. In an implementation where the comprehensive address data set is organized as a database, the matching input street name acts as an index, key, or link to the exact, single record corresponding to that street name in the database, which is used in further processing in subsequent stages. This contrasts with versions of the ZIP+4® engine that access every record having the same Soundex code representation as the Soundex code representation for the input street name and use them for further processing, which, as illustrated by 135 of FIG. 1A, may often be two or more records or rows.

At stage 230, for the case where there is no exact match for the input street name in the fast search table, (as is the case in our example where the input street name "Marne" does not exactly match any of the street names 310 in fast search table 300 for focal local "02"), the process compares the input street name to street names in the fast search table 300 for the focal locale determined from the input address. In one embodiment, the process compares the input street name to every street name in the fast search table 300. As a product of this comparison, stage 230 creates a ranked list of the street names from the fast search table organized in order of the degree to which each street name from the fast search table matches the input street name. FIG. 3C is a representation of an exemplary ranked list 360 of street names consistent with the invention. Because none the character strings in the ranked list 360 exactly matches the input street name, they may be referred to as "fuzzy" matches to the input string.

In one implementation consistent with the invention, when processing digital representations of words, stage 230 uses a non-phonetic matching algorithm to determine fuzzy matches by measuring the similarity between two words. A distance algorithm is an example of a non-phonetic algorithm, and the Levenshtein Distance algorithm is a well known example of a distance algorithm. Other types of non-phonetic algorithms, such as those that measure string metrics or edit distances, (e.g., the Hamming distance algorithm), may also be used to measure the similarity between two words or numbers. Some implementations of distance algorithms output a similarity percentage figure (0-100%) after comparing two character strings, which can be used to create a ranked list of fuzzy matches.

Distance algorithms typically give no significance to character position. For example, the following four pairs of strings each demonstrate a 75% similarity (or expressed differently, a distance of 1) according to the Levenshtein distance algorithm: "WORK" and "FORK," "WORK" and "WORD," "TIME" and "TILE," and "TIME" and "TAME."

In our input street name example from FIGS. 3A, and 3B, the Levenshtein Distance algorithm may indicate an 80% similarity between "Marne" (the input street name) and "Maine" (a street name from fast search table 300), a 60% similarity between "Marne" (the input street name) and "Main" (another street name from fast search table 300), etc.

Using a non-phonetic character string matching algorithm and keeping track of the similarity of the input street name to the street names from the fast search table 300, stage 230 produces a ranked list 360 of street names 350, as shown in FIG. 3C, which reflects how closely each street name from the focal locale matches the input street name. In the example shown in FIGS. 3A, 3B, and 3C, for the input street name "Marne" 325 the most similar street name from the focal locale is "Maine" 315, which is ranked first 355 in the ranked list 360, followed by the next most similar street name "Main," followed by "Mane," etc.

A phonetic algorithm, such as the Soundex algorithm described previously, is not suitable for use in stage 230 because it cannot produce an indication of the degree of similarity between two character strings, and thus cannot be used to create a ranked list or determine which character string is most similar to an input character string.

Referring again to FIG. 2A, at stage 235 the process selects the top-ranked street name as the matching street name that most closely corresponds to the input street name. In effect, this corrects errors, such as a spelling error in the input street name (e.g., "Marne") by replacing the input street name string with a matching, error-free street name string (e.g., "Maine") from the focal. locale encompassing the input address. As explained above, stage 240 uses the selected matching street name from stage 235 to access a comprehensive address data set 150.

Next, the process uses information from the comprehensive address data set 150 to determine whether the building number from the input address is within the number range for the matching street name (stage 245). If the building number is within the number range for the street (stage 245, yes), then the process branches to stage 250. Otherwise (stage 245, no), the process branches to stage 255. In stage 255, the process outputs an indication that the input address was not found in the focal locale, and ends. In stage 250, the process outputs an indication that the input address is valid, and ends. In some embodiments, the output of stage 250 includes the correctly spelled matching street name or the entire corrected input address.

Continuing with the example, at stage 245 the building number in the number field 320 from the input address "99 Marne St, Great Bend, KS 67532" is "99," and the matching street name from stage 235 is "Maine." As shown in the comprehensive address data set 150 in FIG. 1B, the data set row or record 180 for "Maine" has an address range "10-199," which encompasses the building number "99" from the input address, and therefore the process branches to stage 250 in this example and outputs an indication that the input address "99 Maine St, Great Bend, KS 67532" is valid. As noted, in some embodiments the process may output a corrected version of the input address (in this case, correcting "Marne" to "Maine") along with the validity indicator.

One of ordinary skill will recognize that other systems and processes may receive the output of stages 250 and/or stage 255, and perform their operations according to this output. For example; a mailing list may be updated with corrected street names and/or addresses based on the output of stage 250 so that the mailing list contains only corrected addresses; a mailing list may be updated to delete invalid addresses based on the output of stage 255 so that the mailing list contains only valid addresses; a package may be returned to the sender based on the output of stage 255; the focal locale may be expanded and the process run again based on the output of stage 255; the input address may be provided to a human operator for further analysis based on the output of stage 255; or for embodiments that output the address with a corrected street name from stage 250, the corrected address may be verified by a separate system, such as the USPS®'s DPV™ system, which accepts an input address and confirms that at least one delivery has been previously made to that delivery point address.

One of ordinary skill will further recognize that the process of FIGS. 2A and 2B may have stages added, deleted, or modified without undue experimentation and without departing from the scope of the invention. For example stage 230 may be modified to determine whether any street names matched the input street name with a degree of similarity exceeding a specified minimum threshold and output a "not in the focal locale" indication if none of the street names are sufficiently similar to exceed the threshold. For an implementation using the Levenshtein Distance algorithm (or any other fuzzy matching algorithm that produces an output indicating degree of similarity), the threshold may be implemented as a minimum degree of similarity (or maximum degree of difference) between the input string and a valid character string. For example, a delivery service application may require that only valid character strings that are ranked as having a 67% or higher degree of similarity may be considered a fuzzy match to an input string that is part of a delivery address. Applying a 67% similarity threshold to our example, "Maine" would exceed the threshold for the input character string "Marne," but "Main" would not.

For another example of a modification to the process, stage 235 may be modified to choose one street name as being the highest ranked when the matching algorithm outputs two or more equally ranked choices. The determination of a choice may be based on other information from the input address, such as the building number or the name of the person or business associated with the input address, analyzed in light of the information in the comprehensive address data set 150 or other related data sets. Stage 235 may assign the highest ranking to one street name over another based on this additional analysis. Alternatively, stage 235 may be modified to notify a human operator when the matching algorithm outputs two or more equally ranked choices, and the operator may assign one of the choices the highest ranking after investigating tie-breaking criteria. In yet another alternative, stage 235 may be modified to output two or more equally ranked choices with an indication that they are tied, and stages 240, 245, and 250 may be modified to perform a building number range check on each of the tied, equally ranked choices, and if only one passes the range check, output the passing one as the valid street name within the focal locale. In yet another alternative, a stage may be added after stage 235 to invoke stage 255 in the case where ranked list is empty, or where none of the fuzzy matches in the ranked list exceeds a minimum threshold of similarity to the input street name.

In another example of a process modification, stages may be added such that when an exactly matching input street name fails the number range test (stage 245, no), the exactly matching street name is then treated as a non-exactly matching street name and provided as input to stage 230.

For yet another example, similar variations of the illustrated process could be applied to fields of an address other than the street name field 325, such as the city name field 330 or the ZIP Code™ field 340. For instance, in one embodiment of a ZIP Code™ character string implementation, the process may attempt to match an input ZIP Code™ delivery code to a table of ZIP Codes™ encompassed by a focal locale determined by the city 330 and state 335 fields of the input address.

One of ordinary skill will also recognize that although the exemplary process shown in FIGS. 2A and 2B is explained in the context of digital representations of words and numbers that are part of an input address from a delivery service source such as a mailing list file, the words or numbers being processed could come from other sources without departing from the scope of the invention. For example, an input character string of interest could have been read by an OCR system, typed in by a user, interpreted from "bubbles" filled in with a number two pencil on a Scantron™ sheet or other machine-readable form, user-entered with a stylus on a touch screen, such as is common on personal digital assistant devices, or obtained from any other source of machine-read character strings. One of ordinary skill will also recognize that although the exemplary process shown in FIGS. 2A and 2B is explained in the context of character string fields of a delivery address, the principles of the invention may be applied to digital representations of information from other contexts where information related to the information in the digital representation can be applied to determine a set of possible valid interpretations corresponding to the fast search table for a focal locale, such as, for example, social security numbers and place-of-birth records.

Figure 4:
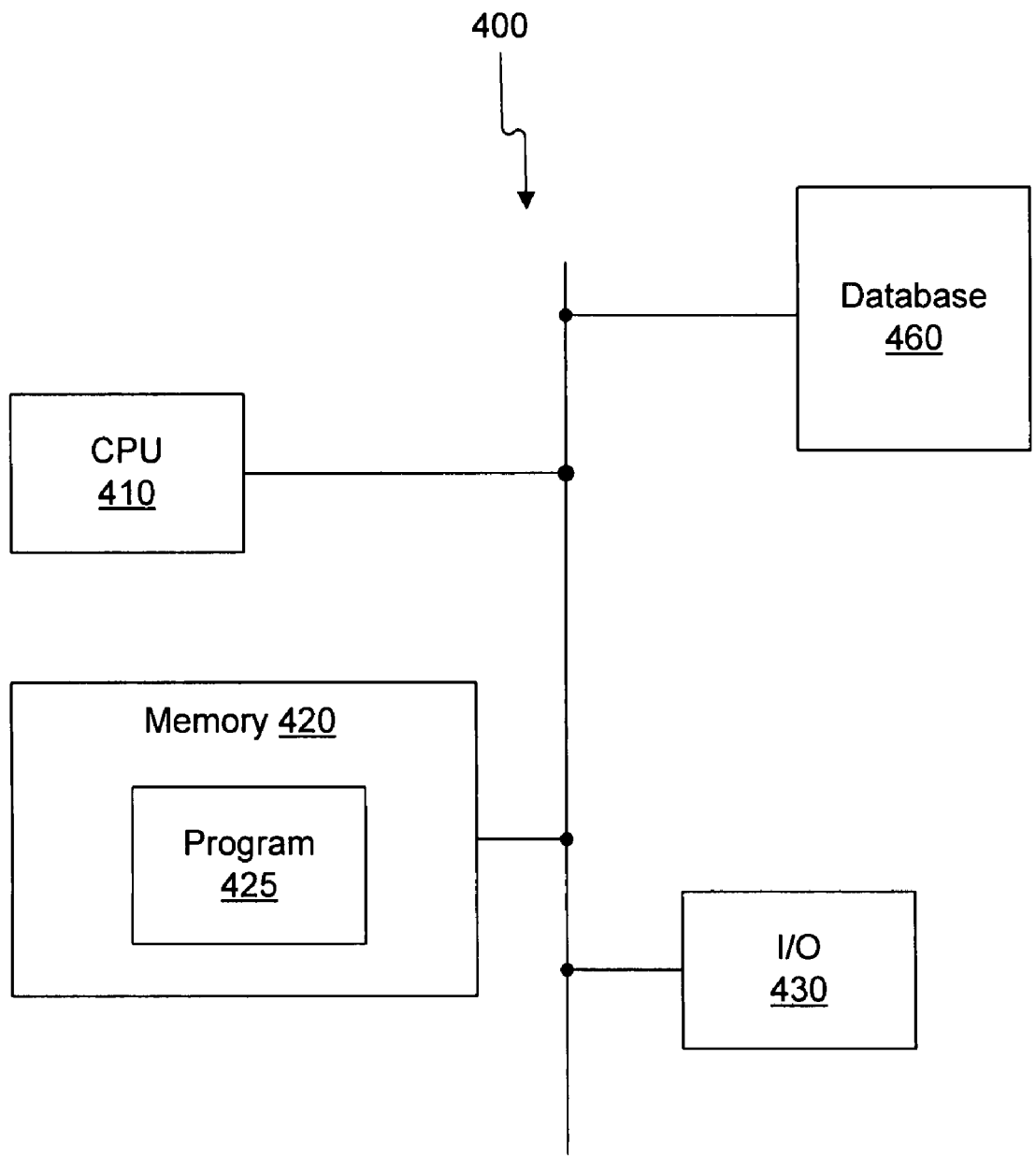
FIG. 4 illustrates an exemplary computing system that may be used to implement embodiments of the invention.

FIG. 4 illustrates an exemplary computing system 400 that may be used to implement embodiments of the invention. The components and arrangement, however, are not critical to the present invention.

Computing system 400 includes a number of components, such as a central processing unit (CPU) 410, a memory 420, an input/output (I/O) device(s) 430, and a database 460. System 400 that can be implemented in various ways. For example, an integrated platform (such as a workstation, personal computer, laptop, etc.) may comprise CPU 410, memory 420 and I/O devices 430. In such a configuration, components 410, 420, and 430 may connect through a local bus interface and access database 460 (implemented as a separate database platform). The access connection may be implemented through a direct communication link, a local area network (LAN), a wide area network (WAN) and/or other suitable connections. System 400 may be standalone or it may be part of a subsystem, which may, in turn, be part of a larger system, such as an OCR system, sorting system, mailing list maintenance system, inventory system, employee records system, financial records system or document processing system.

CPU 410 may be one or more known processing devices, such as a microprocessor from the Pentium™ family manufactured by Intel™. Memory 420 may be one or more storage devices configured to store information accessed, read, and/or used by CPU 410 to perform certain functions and processes related to embodiments of the present invention. Memory 420 may be a volatile or non-volatile, magnetic, semiconductor, tape, optical, or other type of storage device or computer-readable medium. In one embodiment consistent with the invention, memory 420 includes one or more application programs or subprograms 425 that, when executed by CPU 410, perform various methods or processes consistent with the present invention. For example, memory 420 may include a correction program 425 that validates or corrects a digital representation, such as a character string, of a word or number, such as the street name character string from an input address character string, or memory 420 may include a comparison program 425 implementing a process that searches for valid digital representations of a word that match an input word, or memory 420 may include an analysis application program 425 that analyzes information related to the information in a character string for use in determining the correctness of, and if necessary correcting, the character string. Memory 420 may also include other programs that perform other functions and processes, such as programs that maintain electronic mailing lists and programs that perform delivery point verification of a standardized address character string. The programs in memory 420 may communicate with each other.

Methods, systems, and articles of manufacture consistent with the present invention are not limited to programs or computers configured to perform dedicated tasks. For example, memory 420 may be configured with a program 425 that performs several functions when executed by CPU 410. That is, memory 420 may include a program 425 that performs database information extraction functions, search table construction functions, character recognition functions, digital representation (such as a character string) matching functions, character string substitution or correction functions, and machine control functions. Alternatively, CPU 410 may execute one or more programs located remotely from system 400. For example, system 400 may access one or more remote programs that, when executed, perform functions related to embodiments of the present invention.

Memory 420 may be also be configured with an operating system (not shown) that performs several functions well known in the art when executed by CPU 410. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 430 may comprise one or more input/output devices that allow data to be received and/or transmitted by system 400. For example, I/O device 430 may include one or more input devices, such as a keyboard, touch screen, mouse, and the like, that enable data to be input from a user. Further, I/O device 430 may include one or more output devices, such as a display screen, CRT monitor, LCD monitor, plasma display, printer, speaker devices, and the like, that enable data to be output or presented to a user. I/O device 430 may also include one or more digital and/or analog communication input/output devices that allow computing system 400 to communicate with other machines and devices, including control communications. The configuration and number of input and/or output devices incorporated in I/O device 430 are not critical to the invention.

Database 460 may comprise one or more databases that store information and are accessed and/or managed through system 400. By way of example, database 460 may be an Oracle™ database, a Sybase™ database, or other relational database. Database 460 may include, for example, tables or lists of valid digital representations, such as character strings, of address information, such as street name character strings, address information data sets, databases of address fields cross-referenced to other related address fields, geographic data, delivery point data, employee data, governmental data, etc. Systems and methods of the present invention, however, are not limited to separate databases or even to the use of a database, as data can come from practically any source, such as the internet and other organized collections of data.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for validating a character string representing a street name comprising:
   identifying a set of street name character strings corresponding to the streets in a defined geographic focal locale;
   organizing the set of street name character strings into a fast search table, wherein organizing comprises placing the set of street name character strings in alphabetic order;
   receiving an input address string containing an input street name character string field and an input building number string field, wherein the input address string represents a location within the defined geographic focal locale;
   determining a degree of similarity between the input street name character string field and the street name character strings in the fast search table;
   detecting in the fast search table a plurality of street name character strings having a degree of similarity to the input street name character string field that exceeds a predetermined threshold, wherein detecting comprises performing a binary search on the fast search table;
   accessing a single address record corresponding to each of the plurality of street name character strings from a plurality of address records in a comprehensive address data set, wherein each of the single address record includes a number range;
   identifying a matching street name character string among the plurality of street name character strings, wherein the number range associated with the matching street name character string encompasses the input building number string field; and
   outputting an indication that the input address string is valid.

2. The computer-implemented method of claim 1, wherein detecting in the fast search table a plurality of street name character strings comprises:
   using a non-phonetic algorithm to rank the plurality of street name character strings according to their degrees of similarity to the input street name character string field; and identifying a plurality of character strings that has the same rank.

3. The computer-implemented method of claim 2, wherein the non-phonetic algorithm is a distance algorithm.

4. The computer-implemented method of claim 1, wherein outputting an indication that the input address is valid further comprises:
   outputting the matching street name character string.

5. The computer-implemented method of claim 1, further comprising:
   determining that none of the number ranges associated with none of the plurality of street name character strings encompasses the input building number string field; and
   outputting an indication that the input address is invalid.

6. A computer-implemented method for validating a character string representing a street name comprising:
   receiving an input address string containing an input street name character string field and an input building number string field, wherein the input address string represents a location within a defined geographic focal locale;
   locating a search table that contains a set of street name character strings corresponding to the streets in the defined geographic focal locale, wherein the set of street name character strings is placed in alphabetic order;
   detecting in the search table a plurality of street name character strings having a degree of similarity to the input street name character string field that exceeds a predetermined threshold, wherein detecting comprises performing a binary search on the fast search table;
   accessing number range data from an address data record corresponding to each of the plurality of street name character strings, wherein the address data record is one among a plurality of address data records;
   identifying a matching street name character string among the plurality of street name character strings, wherein the number range associated with the matching street name character string encompasses the input building number string field; and
   outputting an indication that the input address string is valid.

7. The computer-implemented method of claim 6, wherein detecting in the search table a plurality of street name character strings that equally match the input street name character string field comprises:

executing a non-phonetic algorithm to determine degrees of similarity between the input street name character string field and each character string from the search table.

8. The computer-implemented method of claim 7, wherein the non-phonetic algorithm is a distance algorithm.

9. The computer-implemented method of claim 6, wherein outputting an indication that the input address string is valid further comprises:
outputting the matching street name character string.

10. The computer-implemented method of claim 6, further comprising:
determining that none of the number ranges associated with the plurality of street name character strings encompasses the input building number string field; and
outputting an indication that the input address is invalid.

11. A computer-implemented method for validating an address comprising:
receiving an input address having an input street name field and an input building number field, wherein the input address represents a location within a defined geographic area;
detecting, in a search table that contains a set of street name character strings corresponding to the defined geographic area wherein the set of street name character strings is placed in alphabetic order, a plurality of street names having an equal a degree of similarity to the input street name field that exceeds a predetermined threshold, wherein detecting comprises performing a binary search on the fast search table;
accessing number range data from an address data record corresponding to each of the plurality of street names, wherein the address data record is one among a plurality of address data records;
identifying a matching street name among the plurality of street names, wherein the number range associated with the matching street name encompasses the input building number field; and
outputting an indication that the input address string is valid.

12. The computer-implemented method of claim 11, wherein detecting comprises:
executing a non-phonetic algorithm to evaluate a degree of similarity between the input street name field and street names from the search table.

13. The computer-implemented method of claim 12, wherein the non-phonetic algorithm is a distance algorithm.

14. The computer-implemented method of claim 11, wherein outputting an indication that the input address is valid further comprises:
outputting the matching street name.

15. The computer-implemented method of claim 11, further comprising:
determining that none of the number ranges associated with the plurality of street names encompasses the input building number field; and outputting an indication that the input address is invalid.

* * * * *

UNITED STATES PATENT AND TRADEMARK OFFICE
CERTIFICATE OF CORRECTION

PATENT NO. : 7,769,778 B2  Page 1 of 1
APPLICATION NO. : 11/819905
DATED : August 3, 2010
INVENTOR(S) : Robert F. Snapp et al.

It is certified that error appears in the above-identified patent and that said Letters Patent is hereby corrected as shown below:

Claim 11, col. 15, line 27, "having an equal a degree" should read -- having an equal degree --.

Signed and Sealed this

Sixteenth Day of November, 2010

David J. Kappos
*Director of the United States Patent and Trademark Office*